UNITED STATES PATENT OFFICE.

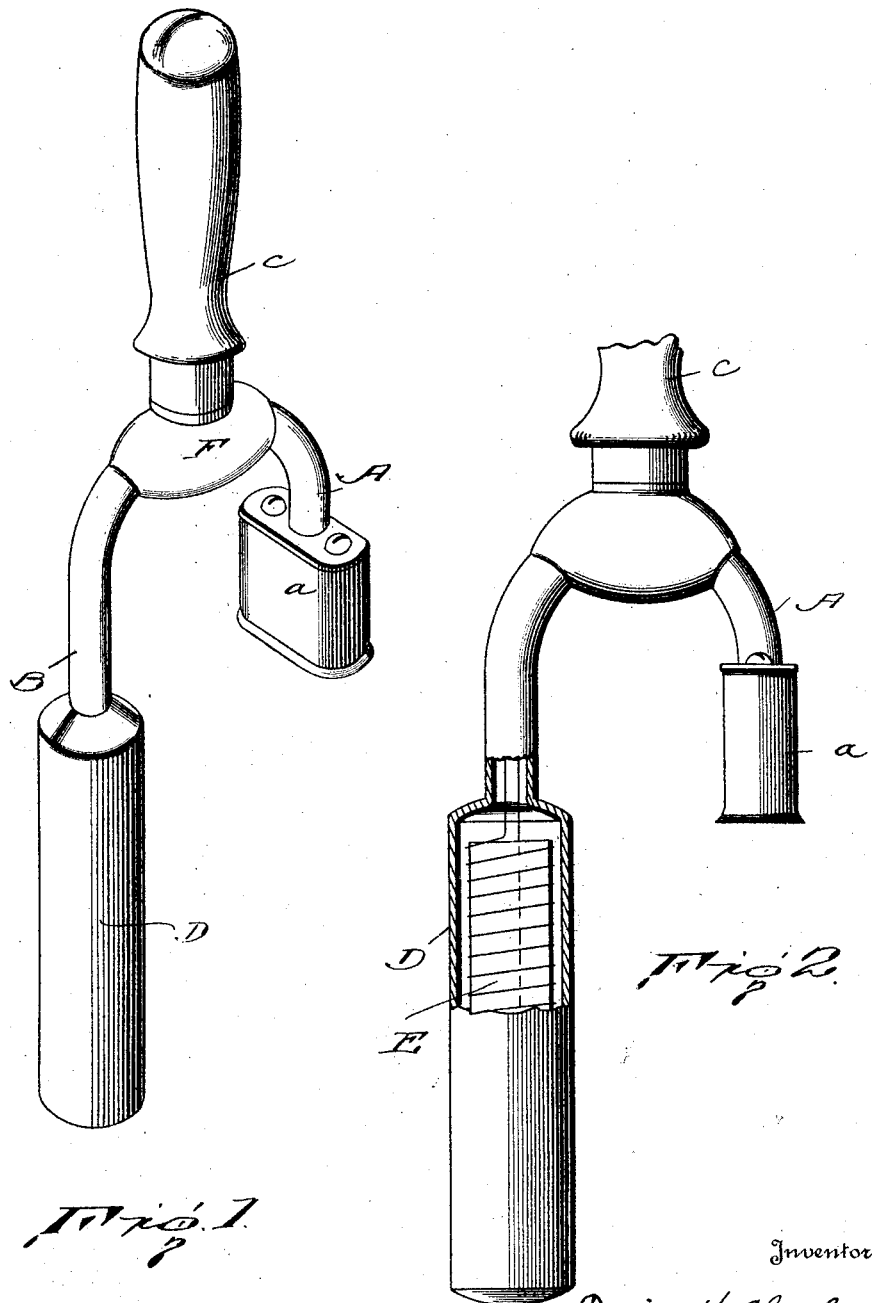

DAVID H. CLARK, OF ORANGEBURG, NEW YORK.

ELECTRIC IMMERSION HEATER.

1,413,322.   Specification of Letters Patent.   Patented Apr. 18, 1922.

Application filed July 2, 1921. Serial No. 482,118.

*To all whom it may concern:*

Be it known that I, DAVID H. CLARK, a citizen of the United States, residing at Orangeburg, in the county of Rockland and State of New York, have invented certain new and useful Improvements in Electric Immersion Heaters, of which the following is a specification.

My invention relates to certain new and useful improvements in electric heaters of the so-called "immersion" type; that is, electric heaters which are designed to be immersed in the liquid contents of a glass or other container for the purpose of heating said liquid. Primarily, my present invention is designed for heating water in which is to be dissolved tablets or other forms of pharmaceutical preparations which are best taken in hot water. The device which I am about to describe may, however, be used in other fields and in practice will be found efficient for rapidly heating water or like liquids for domestic or other purposes.

A leading object of the present invention is to devise a simple form of electric heater having two parallel arms and a handle which projects from the base or junction of the arms, one of said arms having fitted to it or being otherwise provided with contact members for making electrical connection with suitable contacts, and the other arm, constituting the heating element proper, being adapted to heat the liquid contents of a vessel when immersed therein.

I have disclosed and claimed in another application for dispensing apparatus, filed of even date herewith, Serial Number 482,119, one manner of using the present invention, but I do not limit myself to such use.

With the foregoing and other objects in view my invention consists of the improved immersion heater which I will hereinafter describe and claim.

In the accompanying drawing forming part of this specification and in which similar reference characters indicate like parts in the several views:—

Fig. 1 is a perspective view of an electric immersion heater embodying my invention; and Fig. 2 is a side elevation, partly in section, of the same.

In carrying out my invention I form the device of two parallel tubular arms A, B, and a handle C, by which the use of the device is facilitated. The arms and handle have somewhat the appearance of a fork since the arms are parallel and spaced as are the tines of a fork and the handle projects outwardly from the junction of the tines. The arm A, is made shorter than the arm B and it has fixed to it or is otherwise provided with an electrical contact device of any desired well-known form. In the present instance the contact device consists of a casing $a$ enclosing contact points which are designed to make electrical contact with suitable contacts on another part to which an electric current is supplied. This contact device is well known and is not claimed as of my invention and it is referred to as representative of a very desirable electric connector for my device.

The longer arm, B, is the part intended for immersion and it may represent any appropriate form of electric heater. To this end it may carry a casing D which will contain an electric heating coil suitably connected to the contacts within the part $a$, said coil in practice being sufficiently heated by an electric current to rapidly transmit the desired temperature to the liquid contents of a vessel in which the arm B is immersed. Such an arrangement and the mode of operation referred to will be readily understood by those skilled in the art.

The arms A and B are curved at their meeting ends and are joined together, or they may be formed of an integral member. In either case it is desirable that an enlargement F may be formed at the center of the curvature of the arms, and from this enlargement the handle C projects, the handle being attached by any suitable fastening means. The enlargement F may be dispensed with, if desired, but I have found that a more satisfactory connection can be made at that point if it is used.

Having thus described my invention what I claim as new and desire to secure by Letters Patent is:—

1. An electric heater comprising two parallel tubular arms rigidly connected at their bases, and a handle projecting from the central portion of the base connection, one of said arms having an electrical contact device, and the other arm having a self-contained electric heating element.

2. An electric heater comprising two parallel spaced arms and a curved base or union forming a rigid connection between the arms, a handle fixed centrally to said connection and projecting parallel with the major axis of the arms, a contact-making element on the outer end of one of said arms; an encased electric heating element electrically connected to said contact-making element and contained in the other arm, said last-named arm being of greater length than the other arm and adapted for immersion in liquid.

In testimony whereof I hereunto affix my signature.

DAVID H. CLARK.